US008113938B2

(12) United States Patent
Friedman et al.

(10) Patent No.: US 8,113,938 B2
(45) Date of Patent: Feb. 14, 2012

(54) VIDEO GAMES ADAPTED FOR WAGERING

(75) Inventors: Stacy Friedman, Beaverton, OR (US); Jon Muskin, Philadelphia, PA (US)

(73) Assignee: Olympian Gaming LLC, Beaverton, OR (US)

( * ) Notice: Subject to any disclaimer, the term of this patent is extended or adjusted under 35 U.S.C. 154(b) by 0 days.

(21) Appl. No.: 12/705,617

(22) Filed: Feb. 14, 2010

(65) Prior Publication Data

US 2010/0240444 A1 Sep. 23, 2010

Related U.S. Application Data

(63) Continuation of application No. 11/009,944, filed on Dec. 10, 2004, now Pat. No. 7,682,239.

(60) Provisional application No. 60/605,982, filed on Aug. 30, 2004, provisional application No. 60/528,990, filed on Dec. 12, 2003, provisional application No. 60/528,991, filed on Dec. 12, 2003, provisional application No. 60/528,976, filed on Dec. 12, 2003.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. ....................... 463/16; 463/2; 463/5; 463/7

(58) Field of Classification Search ..................... 463/16
See application file for complete search history.

(56) References Cited

U.S. PATENT DOCUMENTS

| | | | | |
|---|---|---|---|---|
| 4,582,324 | A | 4/1986 | Koza | |
| 2002/0049082 | A1 | 4/2002 | Bansemer | |
| 2003/0060248 | A1 | 3/2003 | Yamashita | |
| 2004/0043809 | A1 * | 3/2004 | Gomez et al. | 463/16 |
| 2005/0054405 | A1 * | 3/2005 | Baerlocher et al. | 463/9 |

* cited by examiner

*Primary Examiner* — Dmitry Suhol
*Assistant Examiner* — Kevin Y Kim
(74) *Attorney, Agent, or Firm* — Muskin & Cusick LLC

(57) ABSTRACT

A method, apparatus, and computer readable storage to allow players to wager on video games. The method disclosed herein can allow players to win or lose money while partaking in any video game previously played for entertainment purposes. A player can purchase play time on a game, play the game and earn monetary prizes during the game, and then redeem the monetary prizes for real cash.

20 Claims, 16 Drawing Sheets

VIDEO GAMES ADAPTED FOR WAGERING

CROSS REFERENCE TO RELATED APPLICATIONS

This application is a continuation of application Ser. No. 11/009,944, entitled, "Video Games Adapted for Wagering" filed on Dec. 10, 2004, now U.S. Pat. No. 7,682,239 which a) claims benefit and priority to Provisional Application No. 60/605,982, entitled, "Method and Apparatus for Wagering on Real Time Video Games" filed on Aug. 30, 2004, which is incorporated by reference herein in its entirety; b) and application No. 11/009,944 also claims benefit and priority to Provisional Application No. 60/528,990, filed on Dec. 12, 2003, entitled, "Method and Apparatus for increasing Wagering Game Play Rate," which is incorporated by reference herein in its entirety c) and application Ser. No. 11/099,944 also claims benefit and priority to Provisional Application No. 60/528,991, filed Dec. 12, 2003, entitled, "Method for Providing Player-Selected Variance on Wagering Games," which is incorporated by reference herein in its entirety d) and application Ser. No. 11/009,944 also claims benefit and priority to Provisional Application No. 60/528,976, filed Dec. 12, 2003, entitled, "Method and apparatus for Wagering on Arcade or Video Games," which is incorporated by reference herein in its entirety.

BACKGROUND OF THE INVENTION

1. Field of the Invention

The present invention is directed to a method, device, and computer readable storage medium to provide for video games that allow for wagering.

2. Description of the Related Art

Slot machines are the most lucrative wagering games a casino can provide to its patrons due to their size, operator requirements, and mathematical house advantage. Traditional slot machines involve electromechanical reels rotatable around a common axis and a straightforward gameplay proposition. More modern slot machines expand upon the rotating reels with fully-electronic video implementations and additional bonus opportunities.

However, an entire generation of children raised on video and computer games is currently reaching legal gambling age, and the casinos have not fully taken advantage of the opportunity which computerized gaming presents. Furthermore, a more complete synthesis of slot machines and computer games would provide the player with a wagering entertainment experience far in excess of the typical win-or-lose decision of a slot machine alone.

Therefore, what is needed is a way to provide players with a way to bet on video games previously only played for entertainment purposes.

SUMMARY OF THE INVENTION

It is an aspect of the present invention to provide players an opportunity to place wagers on video games.

The above aspects can be obtained by a method that includes: (a) receiving a deposit representing a cash amount and converting the cash amount into credits; (b) allowing a player to play a video game which allows a player to move around in and interact in a 2-D or 3-D playing world; (c) debiting the player credits based on occurrences in the playing world; (d) awarding the player credits based on occurrences in the playing world; and (e) converting the credits to cash for disbursement to the player.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
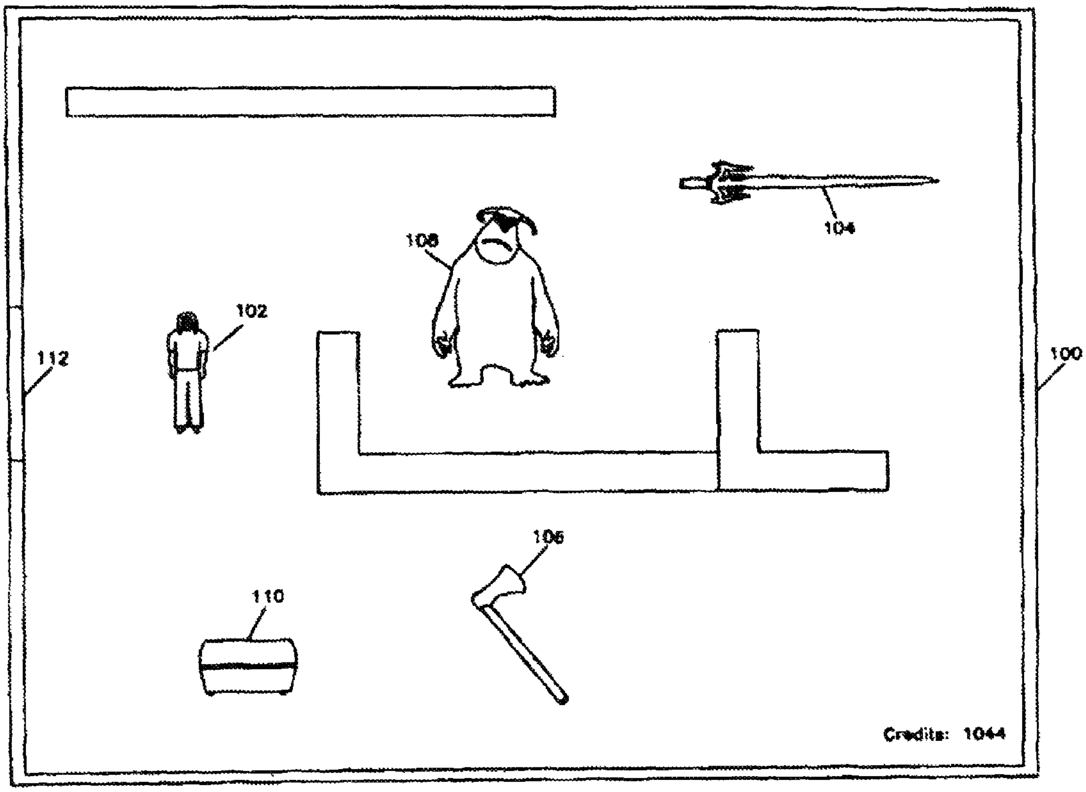
FIG. 1 is an exemplary output display of a video game, according to an embodiment.

Reference will now be made in detail to the presently preferred embodiments of the invention, examples of which are illustrated in the accompanying drawings, wherein like reference numerals refer to like elements throughout.

The present general inventive concept relates to methods, apparatuses, and storages, which can be applied to any known genre of video games in order to allow the game to be wagered upon for real cash.

The general concept involves a player crediting a machine or home computer with real money. The player can then enjoy playing a video game, but will also be winning/losing credits which can ultimately converted to real money or prizes. The video game may involve a player manipulating objects on a screen in real time with an input device such as a joystick. When the player is done or the game is over, the player can then redeem credits for real cash or prizes and realize a win or loss of real money.

Allowing players to wager on video games introduces a number of challenges in the implementation. First, some gaming regulators may prohibit mechanical skill in a wagering environment. Additionally, some players may be intimidated if skill is a factor in wagering games since if the player isn't that skillful, he or she may lose money. If mechanical skill is permitted in a multi-player environment, then only the very best players will be interested in competing. Moreover, if mechanical skill is permitted, then the best players may obtain an advantage, either over the house or over other players in a multi-player environment.

The present general inventive concept provides for a number of embodiments that address the above issues. Note that these variations need not be wholly separate but can be combined. After description of the variations, examples will be presented of their application to known video game genres.

The first embodiment can be called "unlimited access." In this embodiment, a video game which can involve skill is presented to a player. A video game level is presented to the player which has predetermined awards. The player can play the game as he or she would normally, but can also earn credits redeemable for real cash. Credits can be earned for example, by opening treasure chests, killing monsters, passing checkpoints, killing aliens, etc. The player may or may not be allowed to get killed. If the player is killed, he can receive a new life for free. If the game is a racing game, the player may receive an unlimited amount of fuel (or game play). Thus, the player can play the game and redeem all the awards that are available to him or her. When the player redeems all of the awards, the game (or level) can then end. If the player does not wish to complete the level, the player may have the option of automatically completing the level and redeeming all prizes in the level (e.g. no skill).

Thus, the unlimited access embodiment allows the player to play a level of a game of skill and earn prizes. The equalizing feature of this embodiment is that the player will typically be permitted to earn all of the prizes allocated to him or her. The player may not be presented with a game-over condition without the player having redeemed all of the awards available to him or her. Skill may still be permitted in this embodiment, in the sense that it may enhance the player's gaming experience but skill should typically not affect the player's ultimate rewards earned. For example, in a first-person shooter type of game, the player's skill can affect the game-play in that the player can die and be returned to a starting point. However, the player can be given an unlimited number of lives and "power-ups" such that getting killed has no relevance as far as earning credits is concerned.

In the unlimited access embodiment, the player can pay one price per level. The level can then be generated, and the awards can be dispersed. Awards can be disbursed in treasure chests or associated with completing tasks, such as when a monster is killed. The awards can all be predetermined and fixed. Alternatively, a total final award can be generated and after the player performs an action which results in award, a random award (or pre-stored) can be determined, awarded, and deducted from the final award. When the player has earned all of the final award in this manner, the game can be considered over. The final award should be determined at a remote server, although some or all individual awards can be determined locally (or remotely as well) as long as they do not exceed the final award.

A further embodiment can be called "pay as you go." In this embodiment, instead of paying up front for an entire level as in the "unlimited access" embodiment, payment can be made on an event by event basis. Each time an award can be potentially awarded, an appropriate cost can be debited from a player's current credit meter. Then an appropriate award may be awarded to the player.

For example, consider a first person shooter in which a player can run around in a 3D-space and kill monsters and find treasures. Each time a monster is killed or a treasure chest is opened, a player's credit meter (or other type of meter) can be debited and then a potential random award can be awarded (although awards need not be random and can alternatively be pre-stored).

A player may be given the option to decide a "wager amount" which would be the cost to take an action, such as opening a treasure chest. Different actions (e.g. opening a treasure chest, killing a monster, etc.) can have different associated costs. Typically, the higher the wager amount, the greater the expected value of the award. With no house edge, the expected value of the award would equal the wager amount, although of course the house (or party offering the game) may wish to take out a portion for house commission.

In the "pay as you go" embodiment, as in the "unlimited access" embodiment, mechanical skill can be involved in the gameplay, but should not affect the player's win/loss. If a player is fighting a monster and gets killed due to lack of skill, then the player has not lost anything due to his or her lack of skill. If the player succeeds in killing the monster, then the player is debited and possibly credited if he wins an award.

Either of the two above embodiments ("unlimited access" and "pay as you go") can also possess a "continuous wagering" variation. In this variation, credits can be continuously debited and awarded based on a continuous quality, such as time played or distance traveled. The continuous wagering embodiment is better suited to be used with the pay as you go embodiment rather than the unlimited access embodiment (although it can be used with either/both). This is because the unlimited access embodiment can be used offline on a remote computer, but if it is supplemented with continuous wagering, then a real time connection is needed to a server to maintain integrity of the wagering results. The pay as you go embodiment typically needs a real time connection with a server which generates the wagering results anyway. Continuous wagering can be advantageous to the house in that it ensures the player is always placing a bet at all times.

As an example of continuous wagering, in a racing game (although this embodiment and all embodiment herein can be applied to all genres of games), every second (or other time unit) of the game has a corresponding amount of credits debited from the player's credit total. Alternatively, every unit of distance (e.g. $1/10^{th}$ of a mile), a corresponding amount of credits can be debited from the player's credit total. In order to compensate for the continuous debiting of credits, at each unit the player has a chance to win an award as well. For example, if a player is debited at a rate of $0.01 per second, the player may have a 1/100 chance of winning $1 per second (assuming no house advantage). The award can be presented in any manner, either by automatically instantly increasing the player's credit meter with or without a visual award indicated on the display, such as for example running over a coin or cash instantly appearing. In this embodiment, the player will automatically run over the coin without any skill or action by the player. This type of awarding of credits is not limited to a single event, but multiple events can occur. For example, if a player is being continuously debited 0.01/second, the player may have a 1/200 chance of running over a barrel worth $1 and the player also may have a 1/100 chance of running over a mule worth $0.50 (assuming no house advantage). Events can also have the same appearance but different values (e.g. instead of the mule being worth $0.50 a barrel can also be worth $0.50).

Alternatively, awards awarded based on the continuous debiting can be awarded at a later time, such as a later-presented barrel the car being driven runs over. In this manner, the awarding of the proceeds based on the continuous debiting can be awarded at a later time in a manner more in line with the traditional non-wagering counterparts (e.g. presenting a barrel periodically with "power-ups" or awards). If the player is owed money in this manner and the player ends the game (or the game ends naturally) then the game should still award the amount due to the player at such time.

Continuous wagering can have a primary debit and possibly one or more secondary debits. For example, a primary debit can be made in time intervals as long as the player is playing (each debit a wager with a chance to win an award as described previously). A secondary debit can be made based on a user's action, for example the user moving. The secondary debit is also subject to awards as well. Other secondary debits can take place based on discrete player actions, as described herein. For example, each time the player swings at a monster this can be another debit.

In any of the embodiments presented herein, items can be presented that can have a cost associated with their use (but not their pick up). For example, in a dungeons and dragons type of game, an axe can cost 35 units while a sword can cost 50 units. The cost is debited from the player's credit meter when the item is used, e.g. when a user swings at a monster. In return for the higher cost, the player should typically get something in return, e.g. a higher expected award and/or a higher probability of killing the monster.

Further, items can be purchased upon their pickup as well. For example, a key to another section of a level (or to another level in itself) can be purchased with credits. In order to compensate the player for the purchase of the key, the game may optionally generate awards to be redeemed in the section of the game unlocked by the key.

FIG. 1 is an exemplary output display of a video game, according to an embodiment. Of course, the methods described herein can apply to all types of genres of games, not just the genre illustrated in FIG. 1. It is also noted that while the illustrating of FIG. 1 is in two-dimensions, the concepts described herein can be equally applied to a three-dimensional representation.

A player icon 102 represents actions taken by the player. The player can walk in a chosen direction and interact with other objects and characters on screen. A sword 104 and/or an axe 106 can be picked up by the player. A treasure chest 110 can be opened by the player, which may contain an award of credits, which can be converted to real cash later. A monster 108 can be attacked by the player, and if the player kills the monster 108 an award may be presented. The monster 108 may also kill the player. A door 112 can allow the player to enter another portion of level of the game.

The operation of the present general inventive concept will be described with respect to some of the embodiments described herein. It is noted however, that the embodiments described herein do not have to mutually exclusive, and features found in each embodiment can be mixed and matched with other features in other described embodiments or embodiments already known in the art.

The "unlimited access" implementation of a game of the genre illustrated in FIG. 1 will now be exemplified. A player can pay a fixed amount to enter the playing world, which is a computer-defined representation of an area of potential interaction by the player. Instead of paying a fixed amount, a bonus round of a slot machine game can be triggered to offer any of the embodiments described herein, which can be considered "paying" the entry fee to play the game as a bonus game.

Upon receipt of payment, a generation computer can generate or use a pregenerated world. The award generation should not be done a local computer wherein a player can have direct access and control over the algorithms. Award amounts can be allocated for each possible occurrence of an award. For example, in this game, awards are awarded when a player kills a monster or when a player opens a treasure chest. Thus, all monsters and treasure chests are assigned a monetary award. The award assigned is based upon the entry fee and how many awards are to be assigned. For example, if the player pays an entry fee of $100, and there are 100 award opportunities, with no house advantage, then each award opportunity is to have an expected value of $1. Different award opportunities can have different variances. Further, different award opportunities may have different initial costs. For example, if half of the award opportunities are treasure chests and half are killed monsters, the expected value of the killed monsters can be $75/50=$1.50, while the expected value of the treasure chests are $25/50=0.50. Thus, in this example, killing monsters will have a higher expected award. In this manner, killing a monster is more exciting to the player than opening a treasure chest in that the reward is expected to be more. The award amounts can be determined in a manner similar to how a slot machine determines their payouts, or by use of a probability histogram. The pregeneration computer can alternatively start with a final award amount (determined as discussed below) and distribute it randomly throughout the playing world (or level) until the entire amount is distributed.

Note that in the embodiment described above, the awards are all predetermined. Thus, if a player hacks into his or her computer and tries to adjust an amount to be redeemed, it will fail because on redemption (to be discussed in more detail later), the award redeemed must match what the remote pregeneration computer (or computer or server associated with the pregeneration computer) has on file.

As an alternative method to compute the awards for the award opportunities, a final total award amount can be computed by the generation computer. If the game is played on a local computer, the local computer may be able to locally determine each award amount (either initially or on an award-by-award basis), as long as the total amount awarded to the player does not exceed the final award amount. The final award amount can be determined based on an initial entry fee, and can be determined similarly to how a slot machine or other EGD (electronic gaming device) determines a result.

Thus, the player will have the illusion of earning awards while playing the game. In reality, the awards are predetermined, or alternatively, the total amount to be won is predetermined. When the player is finished with the level, the player will have collected all of the award opportunities. If the player has not collected all the award opportunities, but wishes to end the game, then the player can be allowed an option of collection all of the award opportunities without finishing the level. The game may also present the player with a hint screen (possibly upon request) to direct the player to any remaining award opportunities.

During a level, the player may have an opportunity to enter another level. This may be done upon completion of the current level. This may also be accomplished by awarding the player all of the remaining awards he or she still had to collect and then allowing the player to enter the next level. Entering another level can cost the player more money, which can be disbursed to the player by additional awards in that level, as described herein.

Thus, in FIG. 1, the player 102 can open the treasure chest 110 and be presented with a (seemingly) random award amount which can be added to the player's credit meter 112. The player 102 can pick up the sword 104 or the axe 106 at no cost. The sword can cost 10 credits to swing, while the axe can cost 8 credits to swing. although the sword may have more firepower the axe and thus may make it easier to accomplish award goals (such as killing monsters). The player 102 can kill the monster 108 and be presented with a (seemingly) random award amount. The player 102 can walk around the level or playing world in this fashion, enjoying a video game and earning awards as well.

The "pay as you go" implementation of the game described herein will now be exemplified. In this embodiment, the player may not need to pay a fixed entry fee into the world but can deposit an arbitrary amount of cash (convertible to credits) in order to interact in the world. Unlike the "unlimited access" paradigm (which may not require any more deposits), this embodiment typically requires further credits in order to take certain action.

For example, when the player 102 opens the chest 110, this can be associated with a cost which will be debited from the player's credit total, upon which an award is then generated. For example, the cost to open a chest can be $1.00, and the expected value of an associated award can be $1.00 (or 0.99 with a house advantage factored in).

When a player kills a monster, this also has both an associated cost and award. Swinging a weapon at the monster can be free, but the associated cost is debited from the player when the monster actually dies.

Alternatively, swinging a weapon at a monster can have a cost associated with it. The cost can be standard or variable on an item the player currently has, such as a weapon. For example, swinging the sword 104 may have a 0.25 cost associated with it with a moderate probability of hitting (or killing) the opponent. Swinging the axe may have a 0.35 cost associated with it which has a higher probability of hitting (or killing) the opponent. When the monster dies, a potential award is then presented (potential in that the award can still be zero just as a spin on a slot machine may result in a zero win).

In a further embodiment, killing a monster may not be a two state situation, but the monster may optionally have "hit points" associated with him. Hit points are a measure of the monster's fortitude. If the monster were to have 100 hit points, and the player swings a sword and takes 50 hit points from the monster, the player can win an award based on the 50 hit points (e.g. 50 credits or ½ of 50=25 credits, etc.). The monster may also optionally swing at the player and take hit points from the player, in which the player can lose hit points or possibly credits as well. A player's hit points may optionally be maintained separately from his or her credits, and upon losing all of his or her hit points the player can be considered "dead" and the game may end or the player may have to restart from another point with a possible credit penalty for dying.

As a further example, it may cost the player $0.25 to swing a sword which has a moderate probability of hitting the opponent, and $0.35 to swing an axe which has a lower probability of hitting the opponent but a higher probability of killing him outright. If the player swings a sword and hits the opponent for 20 hit points, while the opponent fails to hit the player, the game may award $0.50. If the player swings an axe and kills the opponent, the game may award $5.00. If the player misses, the award may be zero. If the player is defeated by the enemy, the game may reset to a different location within a scene with no money awarded. It is further noted that the likelihood of a player hitting or missing can be calculated by random probability and may not be related to player skill.

In the "pay as you go" embodiment, standing still (or even walking) is typically free, and a cost is debited when a player takes a particular action (which typically allows the player to earn an award as well). It may also be possible for a player to purchase items in the level, such as a key, which have no direct award but can allow the player to access other parts of the world. Other items may similarly be bought which may provide the player additional advantages.

In the "pay as you go" embodiment, weapons, monsters, treasures, etc., can be "respawned" as there is no pre-payment for a finite award amounts as in the unlimited access embodiment.

The "pay as you go" implementation described above can also be used with continuous wagering. Without continuous wagering, when a player stands still, the player's credit meter is typically static, absent computer-generated events (e.g. a monster attacking the player without the player initiating the attack). Making the game continuous would also debit money from the player's credit meter as per unit of advancement in the game. A unit of advancement can be for example a unit of time, a measure of distance, etc. For example, for every second of the game player, the player's credit meter can be deducted a corresponding amount of credits (e.g. 1 credit per second). The player may also have the potential to earn an award for the debits per unit of time. For example, each credit per second debited has a 1 in 50 chance of winning $50 (or $49 with a house edge). Thus, while the player is playing, he or she is continuously gambling. Further, the awards generated in this manner may be presented to the player immediately, or later on in the game. For example, if the player wins the $49 award based on a credit debited per second of play, this $49 can appear (possibly tabulated with other awards) later on in an award, such as in a treasure chest or other "power up."

As a further example of this, a character can walk or stand which costs $0.05 per second. With a 10% probability, the player may find coins on the ground worth between $0.10 and $1.00, with an average worth of $0.50 (a house advantage of 10% for walking). The player may decide to make his or her character run. Running can cost $0.10 per second. The player will find coins only 5% of the time, but now has a 1% chance to catch a butterfly. Butterflies are worth between $1 and $25 with an average worth of $6.50. The house advantage for running is 9%.

In addition to time, units of distance can also be the advancement unit. For example, in a driving game, each meter advanced can have a debit and an award associated with it.

The underlying principle regarding the continuous debits/potential awards is to equalize a player's actions such that skill is not a factor. The debiting of these debits is automatic and typically requires no separate player input or authorization to do so. If a player takes a direct route to a destination or a long route should not matter, mathematically speaking. Of course, if there is a house edge on the continuous debits/awards, then taking a longer route would result in more "bets"

placed which would result in a greater expected loss for the player. Alternatively, a shorter route may be more difficult to accomplish ones goal and/or can cost more per second (or meter). This can equalize the expected value of level completion with regard to the base debit rate.

Figure 2:
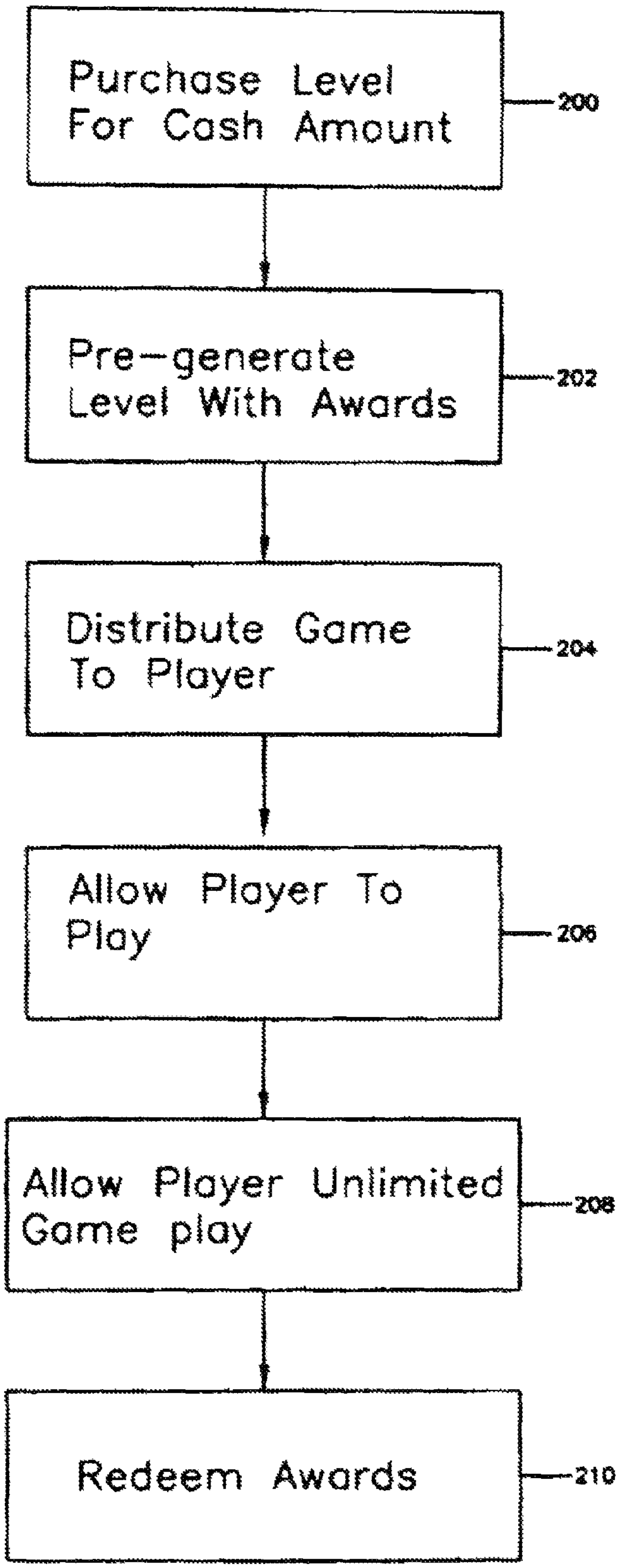
FIG. 2 is an exemplary flowchart illustrating a method of implementing unlimited access to a game world, according to an embodiment.

FIG. 2 is an exemplary flowchart illustrating a method of implementing unlimited access to a game world, according to an embodiment.

The method starts with operation 200, which allows a player to purchase a level or a collection of levels (e.g. an entire game). The purchase can be done over the counter, at a gaming machine, online, etc.

The method can then proceed to operation 202, which pregenerates a level (or the entire game) with awards. This can be done by a computer that an end-user typically does not have access to, so that the end-user cannot hack into the generated awards. The awards can be determined as described herein. Results of the pre-generation can be stored remotely for verification when the player wishes to redeem any awarded credits.

The pre-generated awards can be determined in a number of ways. A level can have a predetermined number of award opportunities (e.g. treasure chests, monsters to kill which reveal an award, etc.). If the player pays a fixed cost for the level (e.g. $100), and there are 100 award opportunities, then each award opportunity can be considered to cost $1 each. Different types of awards can have different costs. Potential awards from each award opportunity can be determined from the award cost, for example a table of probability distributions and awards can be used for each type of award. The awards can then be associated with the award opportunities, which can have fixed predetermined locations, random locations, or a combination. A remote computer generating the levels should typically store data relating to award amounts for verification later, so that the player cannot hack into his or her local system and alter the awards.

Alternatively, a final award amount for a level can be determined based on the purchase cost. The local client can then generate awards on an as-needed basis, as long as the total number of awards does not exceed the final award amount. Once the total number of awards exceeds the final award amount, the final award can be truncated and the game or level can end (at least as far as earning additional awards goes). In this manner a fixed number of awards need not be predetermined, and a user cannot hack into the local system because the remote server can verify the final award amount.

The method continues to operation 204, which distributes the game to the player. This can be done in a variety of ways, such as selling the game in a store, downloading the game (or just the levels and/or a file with the respective awards) to the player, etc. Individual award amounts can be distributed with the software, or a final award amount can be distributed (as discussed herein).

From operation 204, the method can proceed to operation 206, which allows the player to play the game. If the user is playing the game at his or her home, the user's own computer can run the software locally which knows the predetermined awards or final award amount.

From operation 206, the method can proceed to operation 208, which allows the player unlimited gameplay. As described herein, the game may or may not involve player skill, however the player may have unlimited attempts (lives, fuel, etc.) to attain all of the awards in the level or world. Alternatively, the player may not have an unlimited number of attempts, and in this version player skill is relevant to an expected award(s) to the player. In this way, "cheats" are not needed or cannot be used by the player to increase his or her awards.

From operation 208, the method proceeds to operation 210, which allows the player to redeem the awards. If the player is playing at his or her home, the player can log onto a site operated by a company orchestrating the game (or an awards component of the game), which can then receive a code from the player's computer that the player has completed the level (this operation can be optional), and the company can then disburse the amount to the player (e.g. by check, EFT, etc.)

Figure 3:
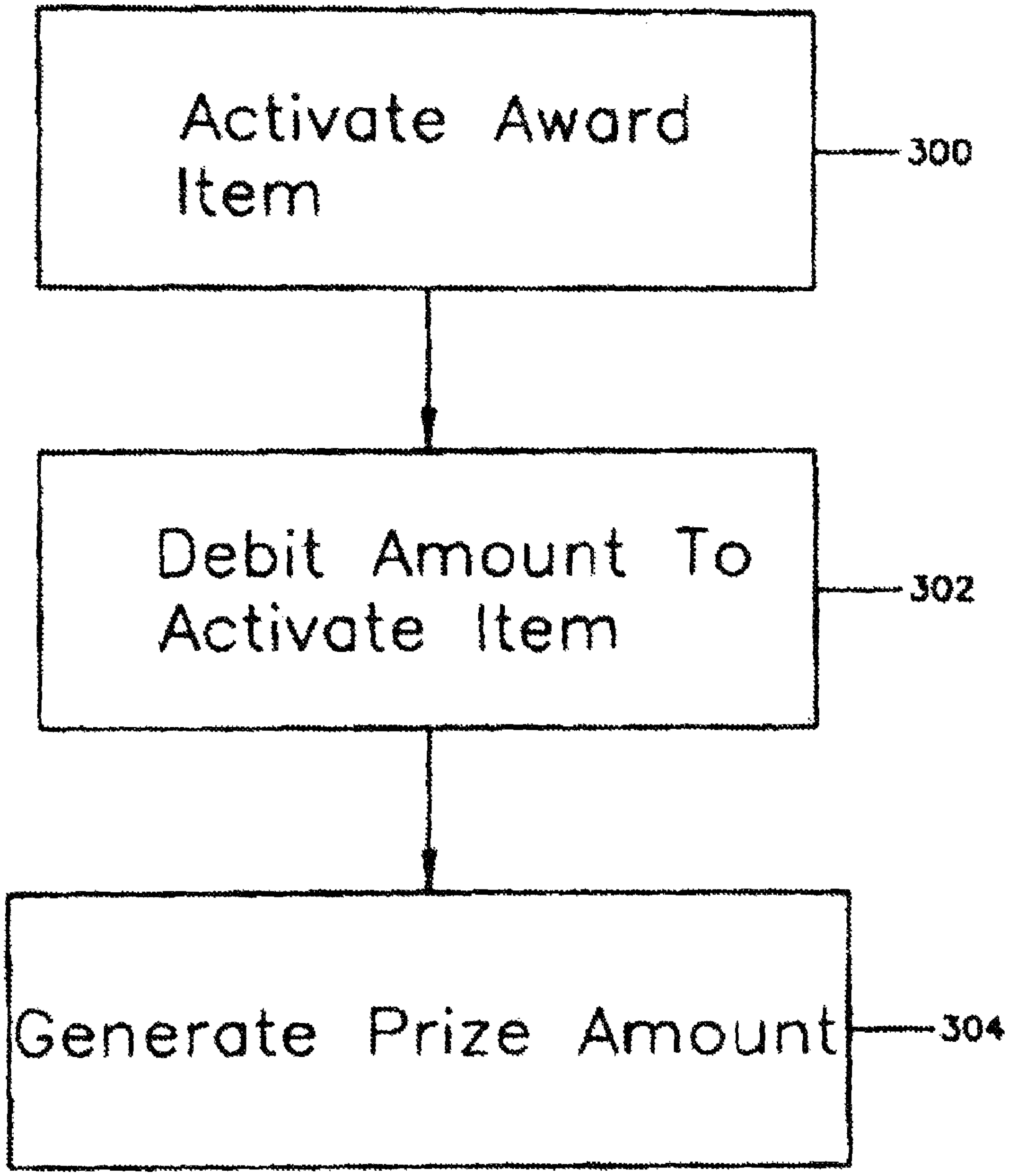
FIG. 3 is an exemplary flowchart illustrating a method of earning awards, according to an embodiment.

FIG. 3 is an exemplary flowchart illustrating a method of earning awards, according to an embodiment. This method can be used in the pay as you go embodiments. This method basically debits an amount when a player is about to potentially earn a reward. For example, when a player kills a monster, an amount is debited from the player's credit meter and an award is potentially generated. While the player is swinging at the monster, this may or may not cost the player anything until the monster is actually killed.

The method starts with operation 300, which activates an award item. This can be, for example, opening a treasure chest, killing a monster, running over a power-up, etc.

From operation 300, the method proceeds to operation 302, which debits an amount to activate the item. Each award item has an associated cost which is deducted from the player's current credits.

From operation 302, the method proceeds to operation 304, which generates a prize amount. Each award item can have a prize distribution. A difficult award item, such as killing a tough monster, may have a relatively higher expected value. Variances of different award items can differ also. A game with high variance will have a lower probability of very high awards (e.g. a slot machine) while a game with low variance will have a high probability of lower awards (e.g. blackjack).

In a further embodiment, a task can be initiated which cost the player an activation fee, and upon success, may result in an award to the player, but on a failure can result in no loss for the player (a refund). For example, a gun can be fired at targets which costs the player an activation cost. If the player has successfully hit the target, the player can achieve an award. If the player has missed the target, then the player can receive a refund of the activation cost. In this way, the element of skill is removed. This can be considered a "failure refund." This is in contrast to a previous embodiment illustrated in FIG. 3 which makes a debit and award credit upon successful completion of the task.

Figure 4:
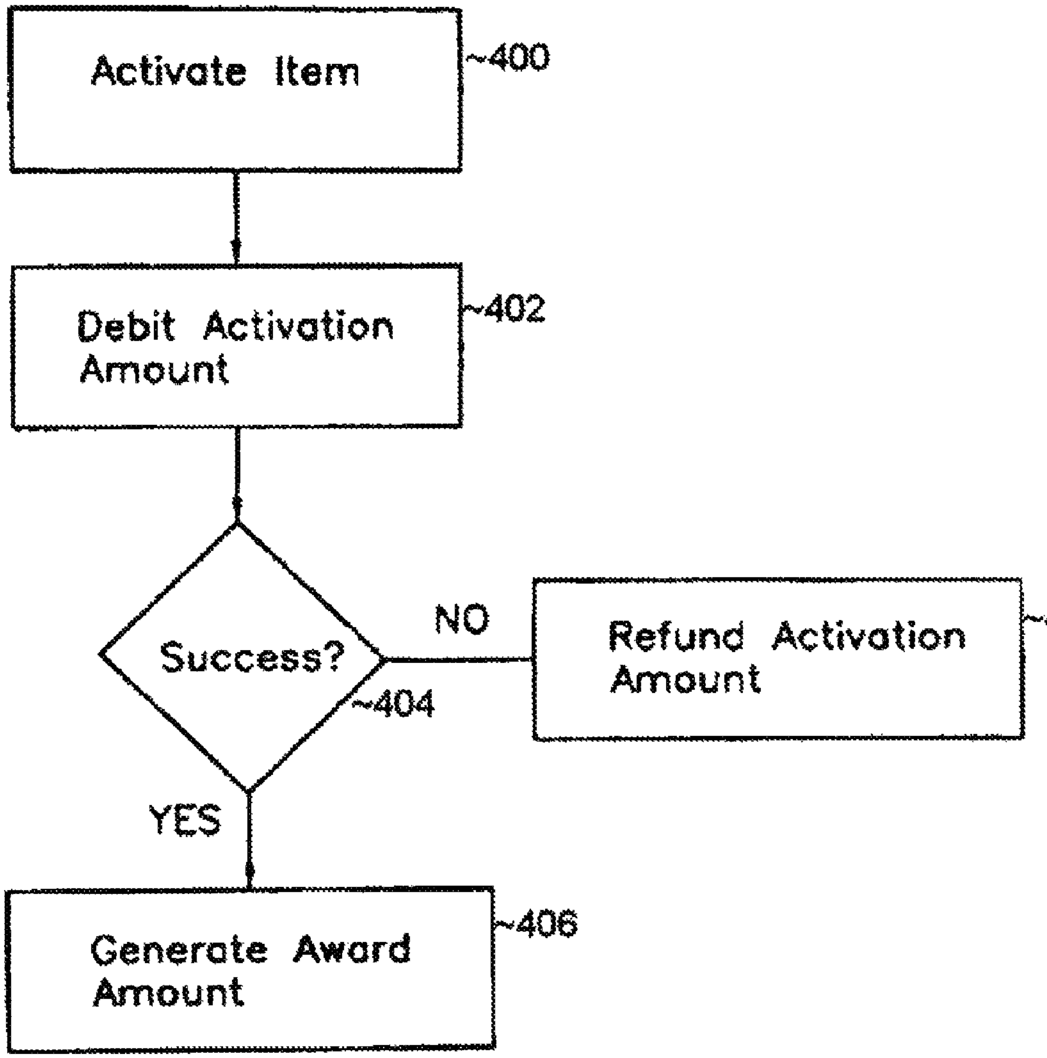
FIG. 4 is an exemplary flowchart illustrating implementation of a failure refund, according to a pay as you go paradigm, according to an embodiment.

FIG. 4 is an exemplary flowchart illustrating implementation of a failure refund, according to a pay as you go paradigm, according to an embodiment.

The method starts with operation 400, which activates an item. This can be associated with any task or object which can result in a result with a monetary award. For example, a gun can be fired.

From operation 400, the method proceeds to operation 402, which debits an activation amount from the player's credit meter. The activation amount is typically a fixed cost so the player knows ahead of time what to expect, but the activation amount can also be a variable amount as well. For example, a gun can have a fixed cost of 0.40 to fire, which is immediately debited from the player's account.

From operation 402, the method proceeds to operation 404, which determines whether the activation was successful. For example, if the bullet fired from the gun hit the target, then the activation was successful. Any task can be activated in this manner, e.g. slaying a monster, firing a weapon, running over a target, etc.

If the determination in operation 404 determines that the activation was not successful, then the activation cost is refunded to the player. For example, if the player fired the gun and misses, the player can be entitled to his 0.40 back.

If the determination in operation 404 determines that the activation was successful, then a respective award is generated and potentially awarded to the player.

In the manner exemplified in FIG. 4, a player can be immersed in a video game with no skill element. Skill can alternatively be introduced into the game by not refunding the player if the activation was not successful, or by refunding an amount less than the activation cost. On the other hand, a player that does not achieve a successful activation has not lost anything while a player that does achieve a successful activation has given up the house advantage on that wager, such that the more skilled player may actually fare worse. However, this embodiment may still be considered legal, as a player that (as one example) misses a target may be comparable to a player that sits idly by a slot machine without wagering.

As discussed earlier, items can be picked up in a game which can be free to pick up but have a cost associated with them to use.

Figure 5:
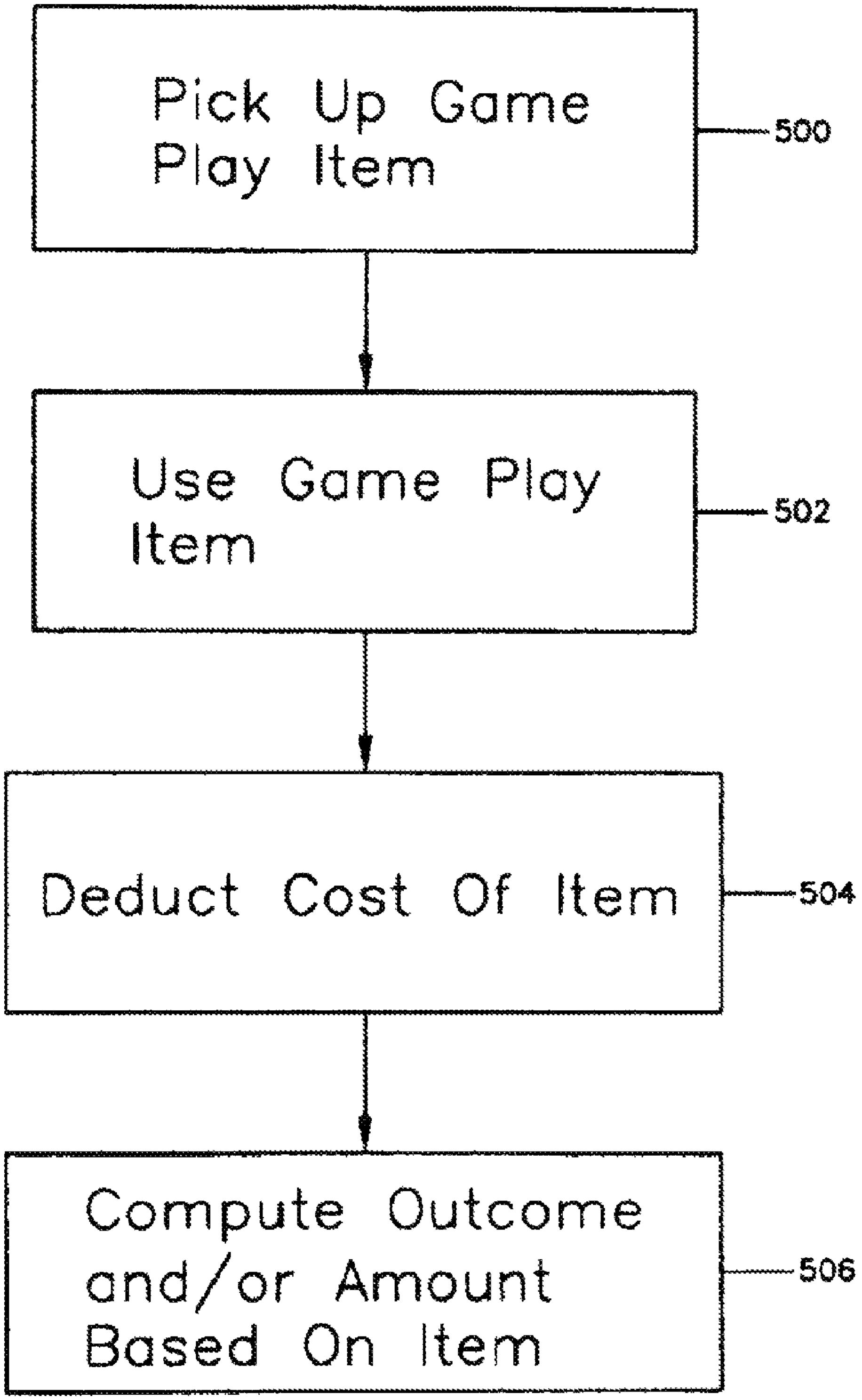
FIG. 5 is an exemplary flowchart illustrating picking up an item, according to an embodiment.

FIG. 5 is an exemplary flowchart illustrating picking up an item, according to an embodiment.

The method can start with operation 500, wherein the player picks up a game-play item. In an embodiment, a last item of a type picked up will replace the previous item used. Alternatively, the player can accumulate items picked up and select from his or her inventory which item he or she wishes to currently use. Which item the player wishes to use can depend on subjective decisions by the player such as how much to wager, what type of variance, etc.

From operation 500, the method proceeds to operation 502, wherein the player uses the game-play item. The item can for example, be a weapon which the player can fire or swing.

From operation 502, the method can proceed to operation 504, which deducts the cost of the item from the player's credit meter. As discussed herein, each item can have an associated cost to use.

From operation 504, the method proceeds to operation 506, which computes an outcome and/or award based on the item. For example, if the player is using a more expensive weapon, then the average award amount of slaying a monster may be higher. An award amount may have a direct relationship with an item cost amount. For example, if a kill of a monster with a weapon that cost $1 results in an expected award of $1, then using a weapon that cost $2 can have an expected award of $2. This can be analogous to betting more on a slot machine.

In a further embodiment, to pick up an item may have a cost associated with it, but use of the item is subsequently free thereafter, either for a limited number of uses or an unlimited number of uses.

In some games, the use of skill may be inherent in the gameplay. For example, a first-person shooter type of game, the aim of the player involves skill. A number of methods presented herein address the equalization of the skill factor. Another manner in which skill can be equalized is to provide for a set percentage of task successes, regardless of the skill of the player. For example, if the player fires an arrow, he or she may have a 25% of killing the target, regardless of the skill of the player. If the player actually misses, there may be a 25% chance that the arrow will bounce off a tree and hit the target. If the player actually hit the target, then the arrow will have a 75% chance of actually striking a piece of armor on the target such that it does no damage. In this manner, a skilled and unskilled player can fire arrows at targets while having the results therein equalized.

It should be noted that the likelihood of a player actually earning an award (e.g. missing or hitting the enemy) is calculated by random probability and not related to any player skill. In the vast majority of cases, player skill will not be permitted in a casino setting; for that reason, the mathematical model must be a random one. While many computer video games rely upon hand-eye coordination skills, these casino counterparts will rely upon randomness. The translation will vary from game to game, but generally, for each player action that requires skill (shooting an arrow, driving a car, etc), the game will include multiple mathematical models, one for each level of skill displayed by the player. A player who is more skillful may hit the enemy more often, or may crash the car less often, or may be perceived as "doing better." However, it is possible to construct two or more mathematical models, one for a "skilled" player and one for a less-skilled player, where the house advantage is nonetheless similar based on the possible outcomes. As an example, in a game where the player is shooting arrows at a distant enemy, the game may provide an aiming facility. A skilled player may be able to aim well, giving the impression that her arrows have struck the target. A corresponding first model will assign award distributions to this skilled player. An unskilled player may not be able to aim well, and visually his arrows may often miss the mark. However, these same arrows may occasionally strike a rock and glance off toward the enemy, causing damage. A corresponding second model may assign a lower probability but higher award to this event, causing the overall expectation to be similar or identical to the skilled player's. In this way, the skill component of a game can be reduced to a visual distinction, and the underlying mathematical expectation of both players will remain the same.

From a mathematical standpoint, for each weapon, enemy, and attack, there is a set of possible outcomes and associated awards which forms the basis of the mathematical model for attacking an enemy. More generally, for each action the player can take in the virtual world, there is at least one set of possible outcomes and associated awards which similarly forms the basis of the mathematical models in this game. Unlike a standard slot machine, games using the present methodologies will have multiple mathematical models, at least one for each kind of action available, and these models may vary widely in mean, standard deviation, and skew.

Figure 6:
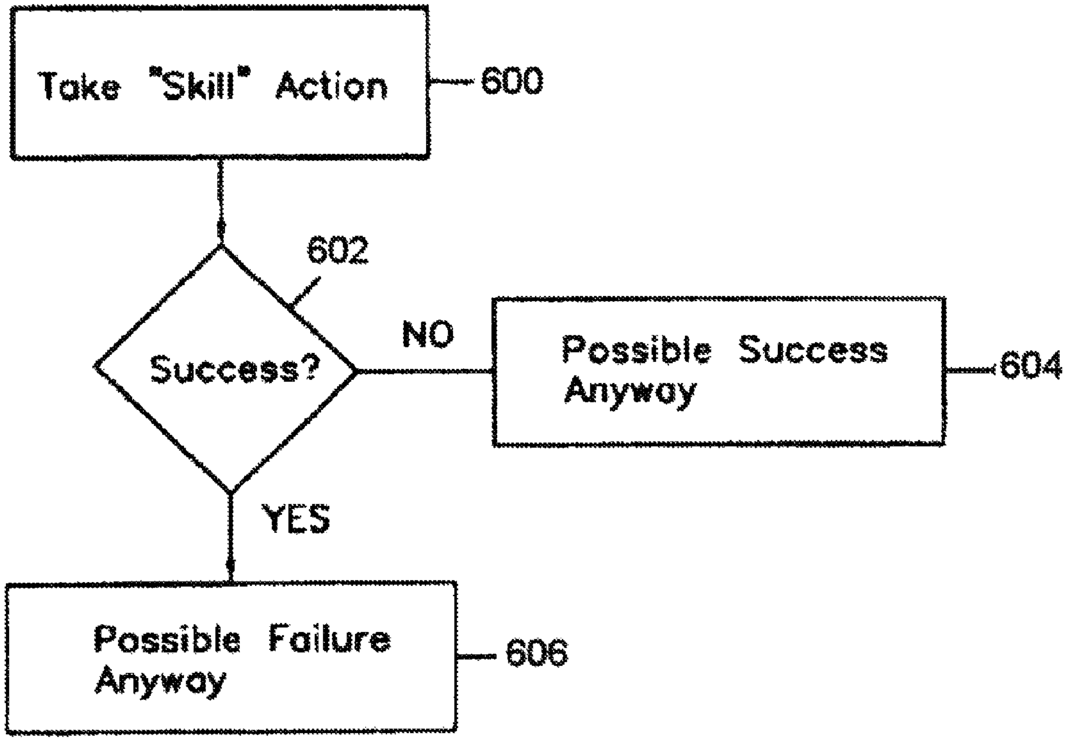
FIG. 6 is an exemplary flowchart illustrating equalizing a skill action, according to an embodiment.

FIG. 6 is an exemplary flowchart illustrating equalizing a skill action, according to an embodiment.

The method begins with operation 600, wherein a player takes a "skill" action. This can be firing a weapon, running over a target, moving a paddle to catch a target, swinging a baseball bat at a baseball, etc.

The method proceeds to operation 602, which determines whether by virtue of the player's skill the player has successfully completed the action.

If the determination in operation 602 determines that the player has not successfully completed the action, then the method proceeds to operation 604, which based on probability, determines whether the action will be successful anyway. If the action is to be successful anyway, then a further display can reflect this (e.g. an arrow bouncing back into the direction of the target, a football deflecting off another player into the intended receiver, etc.)

If the determination in operation 602 determines that the player has successfully completed the action, then the method proceeds to operation 606, which determines whether the action will fail anyway based on probability. If the action is to fail anyway, then an indication of this can be displayed, e.g. a football being fumbled from the receiver's arms.

In the manner exemplified in FIG. 6, a player can play a skill game but ultimately the expected value of the outcome will still be the same regardless of the player's skill.

As described herein in the continuous wagering category, advancement of the game can continuously cost the player. Ultimately these continuous costs are still broken up into discrete intervals (e.g. a second, a $1/10^{th}$ of a mile, a step traveled, etc.) However, during play, they will appear to the player to be "continuous" and without interruption.

Figure 7:
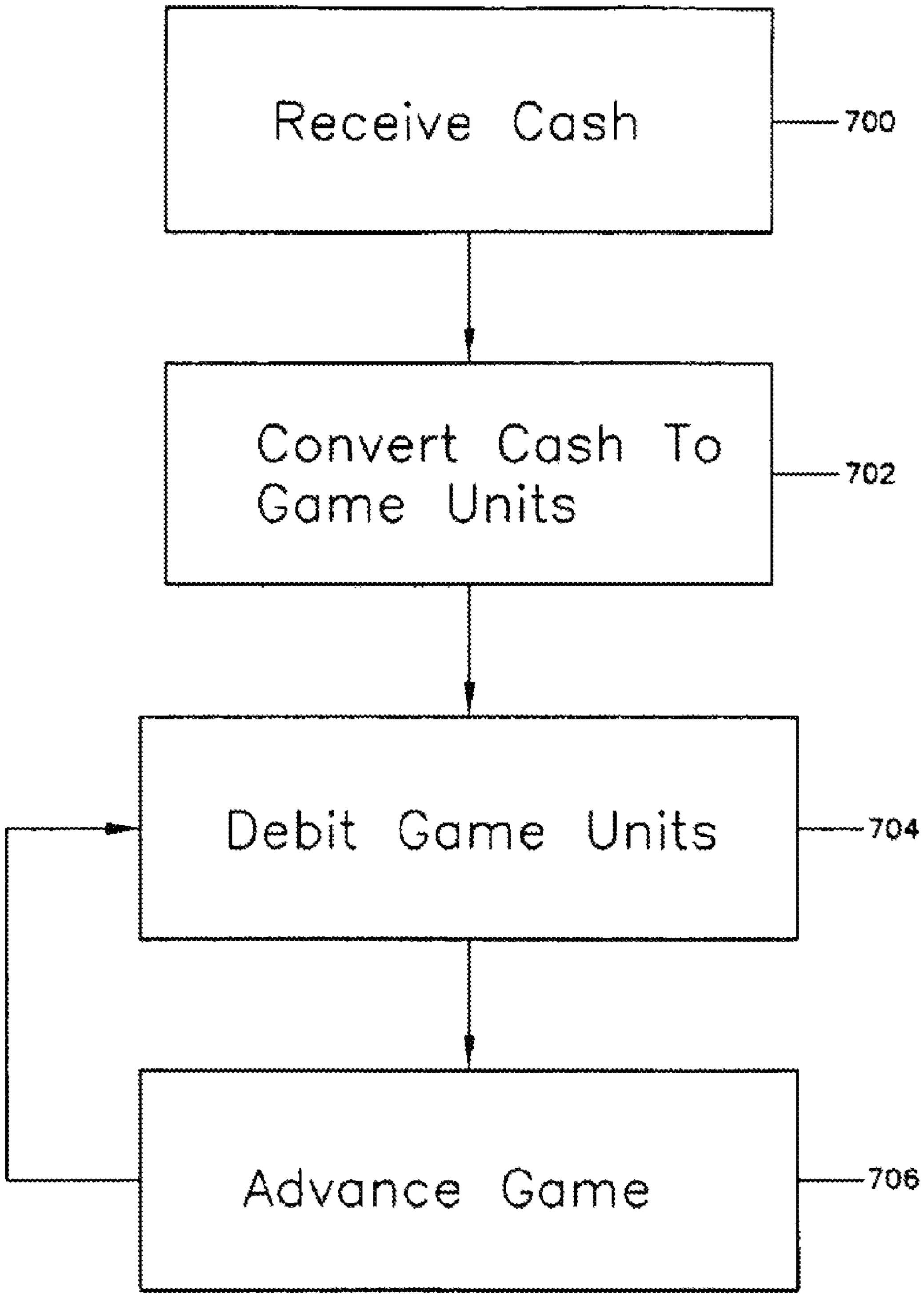
FIG. 7 is an exemplary flowchart illustrating a continuous implementation, according to an embodiment.

FIG. 7 is an exemplary flowchart illustrating a continuous implementation, according to an embodiment.

The method can start with operation 700, which receives cash from the player. This can be in the form of a cash deposit into a slot machine, a credit card deposit, EFT, etc.

From operation 700, the method proceeds to operation 702, which converts the deposit into game units. The cash is converted into game credits typically using a conversion ratio.

From operation 702, the method can proceed to operation 704, which debits credits per unit of game advancement, as explained herein. This insures money is constantly being wagered, typically per time unit or distance traveled.

From operation 704, the method proceeds to operation 706 which continues to advance the game. In other words, once a unit of time is paid for (e.g. a second, five seconds, a minute, etc.) then that unit of time can be played by the player. The method can then return to operation 704.

In various embodiments of the present general inventive concept, when a player's current credits is depleted the game should come to an end. For example, this is the case in any of the continuous embodiments. For the non-continuous embodiments, if the player's current credits is zero, the player will typically not be able to take any actions, and the game could be terminated. Before the player is out of credits, the player should be warned that he or she needs to deposit more funds.

Figure 8A:
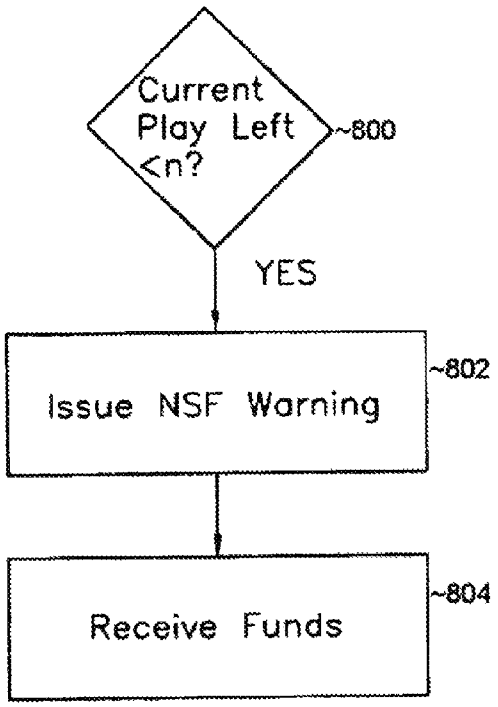
FIG. 8A is an exemplary flowchart illustrating a method of issuing a low funds warning, according to an embodiment.

FIG. 8A is an exemplary flowchart illustrating a method of issuing a low funds warning, according to an embodiment.

The method starts with operation 800, which determines whether a current number of credits is less than a predetermined threshold (n).

If the determination in operation 800 determines that the current number of credits is less than a predetermined threshold, then the method can proceed to operation 802, which issues an NSF (non-sufficient funds) warning to the player. This can typically be accomplished on the output display including an optional audible message.

From operation 802, the method proceeds to operation 804 which can receive additional funds. Additional funds can be converted into game credits which can then continue the game with an interruption.

Figure 8B:
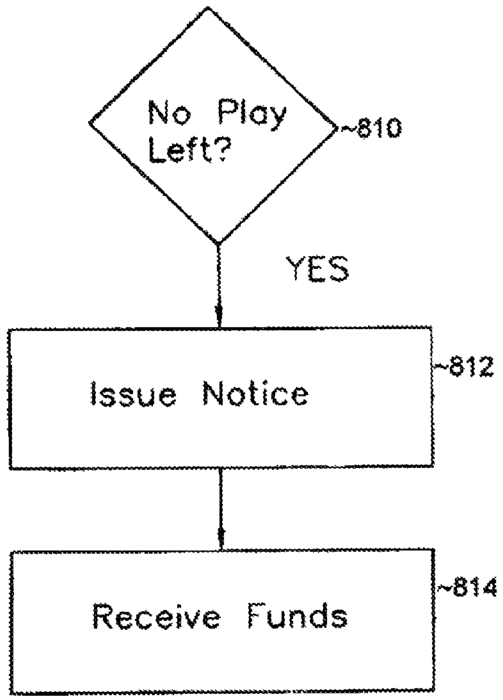
FIG. 8B is an exemplary flowchart illustrating a method of issuing an insufficient funds notice, according to an embodiment.

FIG. 8B is an exemplary flowchart illustrating a method of issuing an insufficient funds notice, according to an embodiment.

The method can start with operation 810, which determines if there are no funds left (or an insubstantial amount of funds left).

If the determination in operation 810 is positive, then the method proceeds to operation 8102 which issues a notification that the player is out of funds. The game can terminate at this point, with the state possibly being saved for later continuation.

From operation 812, the method proceeds to operation 814, which receives funds. Additional funds can be converted into game credits which can then continue the game.

A multi-player embodiment can also be accomplished using a computer communications network, such as the Internet. Different players in the multi-player embodiment can interact with each other, cooperate, and possibly fight with each other.

Players can cooperate with each-other to achieve a common goal. For examples, different players can cooperate to slay a dragon. While they are trying to slay the dragon, the dragon may attack back which can cause individual players (or the attacking group) to be penalized. The penalty can come in a form of lost hit points, credits, etc. When the dragon is killed, an award of points (e.g. credits, etc.) can be made to the players. The award can be evenly divided, or the award can divided such that the more effective attackers receive more points.

Figure 9A:
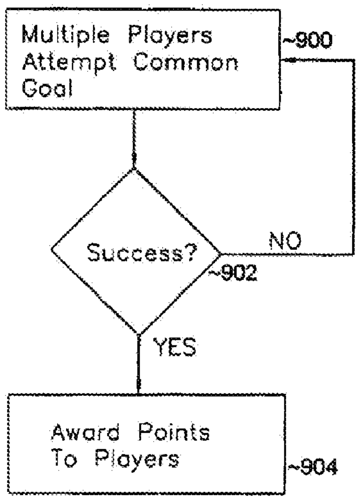
FIG. 9A is an exemplary flowchart illustrating a method of implementing team play, according to an embodiment.

FIG. 9A is an exemplary flowchart illustrating a method of implementing team play, according to an embodiment.

The method can start with operation 900, wherein multiple players attempt to achieve a common goal. The common goal can be slaying a monster, etc.

The method can then proceed to operation 902, which determines whether the goal has been successfully achieved. If the goal has not been successfully achieved, then the method can return to operation 900 which allows the players to continue to attempt the goal. Further, the players may undergo penalties while unsuccessfully achieving the goal. For example, while attacking a monster, the players can also be attacked and lose points.

If the determining in operation 902 determines that the common goal has been achieved, then the method can proceed to operation 904, which awards points to players. The points can be any type of points, for example credits, etc. If the goal is killing a monster, and the monster has been killed, then if the goal was worth 100 credits, then this credit amount can be equally divided among all players participating in the goal. Alternatively, the award can be divided based on success of individual players. For example, if player A has taken 5 hit points from the monster, and player B has taken 10 hit points from the monster, then player B may be awarded twice as many credits as player A.

It is further noted that in addition to killing a monster, a goal may also be to just take hit points from the monster (e.g. successfully attack.) If player A attacks a monster and takes 10 hit points from the monster, then player A can be awarded an amount of credits based on the 10 hit points (e.g. 10×a constant such as 2=20 credits). The monster can also attack the player, which can cost the player hit points and/or credits as well.

If inter-player fighting is allowed, then debits and credits between players can be determined as described herein with respect to the player and a monster. When one player earns credits based on an attack against another player, the other player can accordingly lose credits. With no house edge, the credits exchanged can be equal, although even with no house edge the exchange does not have to be equal. For example, a debit for an attacker and a defender can each be $1, and a winner can be chosen at random. The winner can have a 1/5 chance of winning $10. Thus, the winner of the attack may win $10 or $0 while the loser has lost $1.

When a player is attacked by another the player, the attacked player can lose any type of points (e.g. hit points, credits, etc.) In an embodiment, a player may designate how many credits he or she wishes to risk in inter-player attacks. For example, if a player possesses 1,000 credits, the player may not wish to risk all 1,000 credits and may allocate 100 credits for use in attacks. An example of this follows: Player A has 1,000 credits and designates 100 credits to be risked.

Player B has 50 credits and designates all 50 credits to be risked. Chances of success (e.g. making a successful blow or kill) for each player can be equal, based on a weapon (which may have a cost associated with it), based upon a defensive unit such as a shield (which may have a cost associated with it), can be based upon a strength of the player, can be based upon the credits designated to risk, or any combination of these factors. For example, a game which bases chance of success based on the credits willing to be risked can give a higher probability of success to the player with the higher risk amount. In the above example, since player A has 100 risk credits and player B has 50 risk credits, the chances of A killing B can be (100/(100+50))=⅔ to take A's 50 credits, while the chances of B killing A are (50/(100+50))=⅓ to take B's 100 credits. It is noted that each player's expectation is the same. Thus a player who wishes to risk a large amount of credits can walk around the virtual world as a "bully," but the "weakling" with relatively few risk credits may get lucky and take the bully's risk credits.

Other factors can also (or alternatively) be used, for example to swing a better weapon may cost more than a less powerful one. As a further example, player A may have 100 hit points and player B may have 50 hit points. It may cost player A 5 credits to swing a mace (which for example can do player B an expected damage of 10 hit points) while it may cost player B 15 credits to fire a gun (which for example can do player A an expected damage of 30 hit points). Note that in this example hit points (a measure of a player's fortitude) and credits are two separate point levels. When a player's hit points are deducted, a corresponding award amount (may, or may not be equal to the deducted amount and computed using the factors described herein) can go to the other player's credit meter. For example, if player B fires the gun (at a cost of 15 credits) and does 20 hit point units of damage to player A (e.g. player A loses 20 hit points), then player A can earn 20 credits (or an amount of credits which is determined based on the hit point loss, e.g. multiplying the hit point loss by a constant). In this example, hit points and credits are two separate meters, but in a further embodiment they can be combined. For example, a player's credit meter can be the player's hit points and any successful attack or damage to the player can result in a gain or loss of credits, respectively. The gain or loss of credits can be computed as described above. When a player's credit meter reaches zero, the player has died.

A shield can also optionally be used which costs money to wield but can protect the player from attack. For example, a shield can cost 5 credits to wield, and the shield can be expected to prevent 5 units (or any other amount) of damage to the player.

A defense may also cost a player credits with a potential to reduce a loss of credits. With no skill involved (and no house advantage), a cost to defend should typically be equal to the potential reduction of credits lost (in the embodiment which combines hit points and credits). Where credits and hit points are separate, a cost to defend can be separate from hit points lost. For example, a player may have 10 hit points and 900 credits, and it may cost this player 5 credits to raise a shield which would be expected to reduce a blow to the player by 1 hit point. If the player dies (e.g. hit points=0), the player may lose 500 credits, such that the value of the 1 hit point is equal to the 5 credit cost. Different strengths shields may have different costs associated with them.

Factors described herein (number of credits owned, number of credits to risk, current weapon, current shield, hit points, etc.) can be used individually or in any combination in order to determine a result of an attack, which can result in a redistribution of credits and/or hit points (including a possible distribution to the house). The principle that skill should not be a factor should be preserved (although it is not required to be). However, using different weapons, shields, strengths, etc., would typically make the game more interesting than having player A fight player B with a random outcome (e.g. 50/50) with an even distribution of points to the winner. An attack can cost a player credits which may earn a potential award in proportion to the cost of the attack (and perhaps the other players cost to defend). Choices made by the player regarding choice of weapon, shield, path to take, level to enter, party to attack, etc., should not have an affect on the player's credit expectation but may have an affect on the variance of the player's credit gain/loss. While skill can optionally be a factor, if skill is eliminated (or reduced) using the methods described herein, then this may serve not to alienate the weaker players.

Further, any redistribution of credits can also have a house commission associated with it. For example, for every 100 credits earned by a player, the house may take 1 credit. This can pay the house for the operation of the game. Alternatively, periodic awards to the house can be made (e.g. every 1 in 10 awards (random or sequential) to the player may be reduced to distribute a portion to the house). The house may also take their commission on conversion from credits to cash. For example, upon cashin $100 may equal 1000 credits, while upon cashout, 1000 credits may be redeemed for $99. Alternatively, some costs associated with fighting (e.g. using a weapon, etc.) may be paid in part or in full to the house as opposed to being used for redistribution to the players involved in the fight.

Figure 9B:
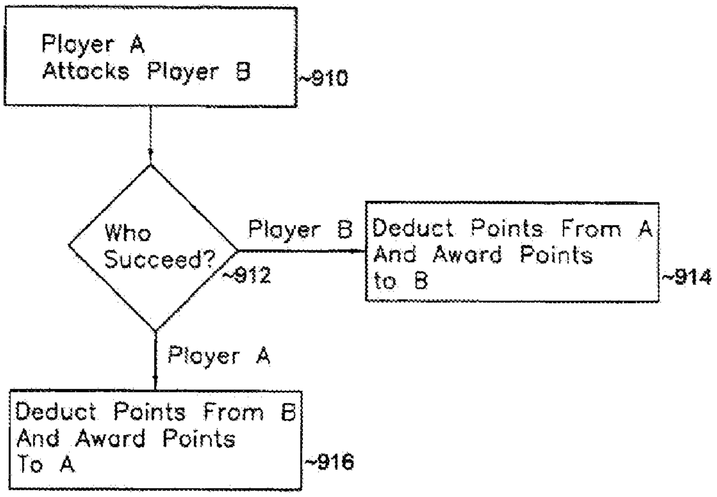
FIG. 9B is an exemplary flowchart illustrating a method of implementing player against player attacks, according to an embodiment.

FIG. 9B is an exemplary flowchart illustrating a method of implementing player against player attacks, according to an embodiment.

The method can being with operation 910, wherein player A attacks player B. This can be done as known in the art.

From operation 910, the method can proceed to operation 912 which determines who succeeded. Success can be either a kill of the enemy or just making a successful blow (or other attack) which can take hit points from the enemy. Success can also be winning a race with another player, or any type of known player vs. player competition in the video game art.

From operation 912, if player B has succeeded, then the method can proceed to operation 914, wherein points are deducted from player A and points are awarded to player B. Alternatively, only one of these distributions may take place (e.g. points are deducted from A but not awarded to B or points are awarded to B but not deducted from A). Further, points can comprise any type of points mentioned herein or known in the art, such as credits, hit points, etc.

From operation 912, if player A has succeeded, then the method can proceed to operation 916, which is basically the opposite of operation 914 as described.

Figure 10:
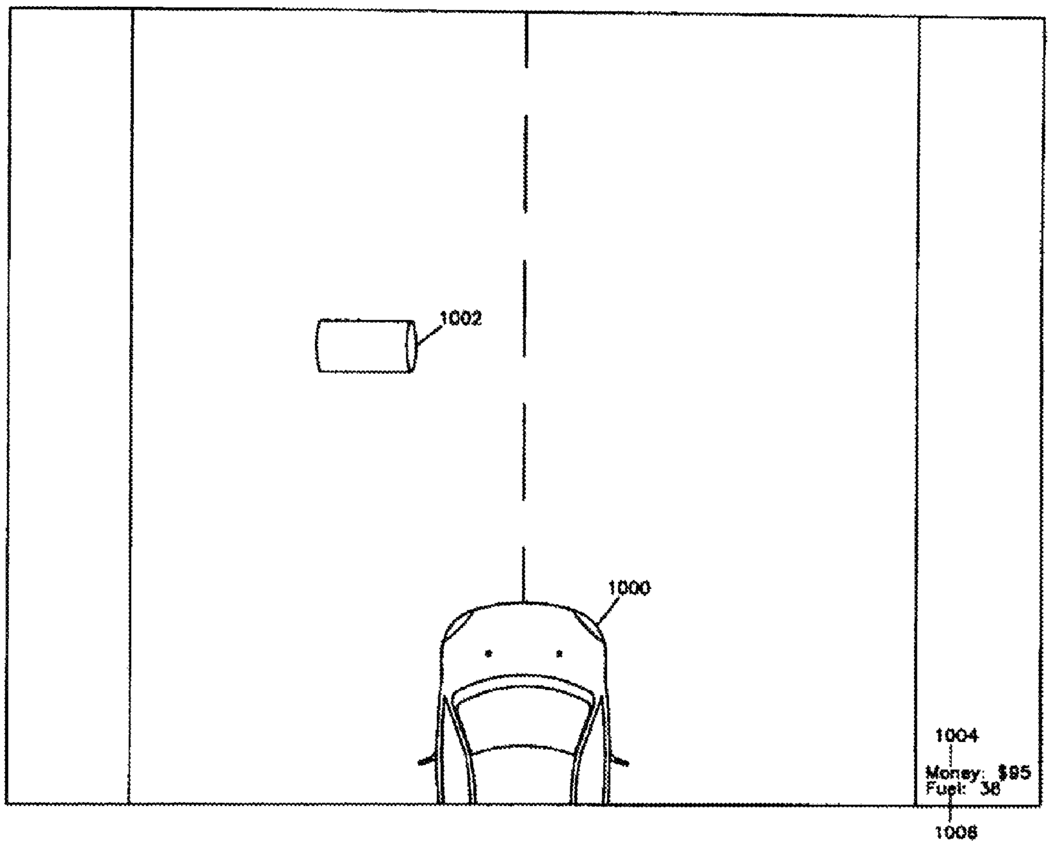
FIG. 10 is an exemplary output of a 3-dimensional driving game, according to an embodiment.

FIG. 10 is an exemplary output of a 3-dimensional driving game, according to an embodiment.

This genre of game can be used with any combination of the embodiments and variations described herein. For example, in the "unlimited access" category, a player could pay to receive an entire track, level, or set of tracks. The track could contain power-ups such as a barrel 1002 with award amounts or other power-ups such as fuel, nitro boost, etc. The track can contain other cars which can interfere with the player's car and even destroy the player. The track can also contain forks and choices of which roads to take. The track can also contain hidden areas and shortcuts. The player can drive around in his or her car 1000 and collect all of the power-ups that contain awards. When all the awards are accumulated, the game can indicate to the player that he or she has completed the awards, and the player can have the option to continue the game or end. The player can play with an unlimited number of lives, an indestructible car, etc.

This genre of game can also be used with the "pay as you go" embodiment. In this embodiment, each time the player uncovers a barrel, an activation amount can be debited from the player as well as an award amount can be generated (an award amount of $0 means the player hasn't won anything). The player can destroy other cars on the road, upon their destruction both an appropriate activation amount can be debited as well as an award amount be generated.

This genre of game can also be used with the pay as you go embodiment as described herein but also with continuous debiting, as described herein. The player can be debited per unit of time or distance traveled. For example, if the player is debited $0.05 per second, and the race would typically take three minutes maximum, then the player would have to pay a maximum of $3.00 per minute or a maximum of $9.00 for the race. However, the player would typically win awards during this time so it would typically be unlikely for the player to lose all the money straight. Awards can be generated for each unit of time and can be awarded instantly or collected for a later disbursement (e.g. in the form of a power-up).

A money meter 1004 indicates how much money the player currently has. Alternatively, a credit meter can be displayed which displays a number of credits the player currently has, which can be converted to a monetary amount typically by multiplying by a constant. A fuel meter 1006 can be displayed which indicated how much fuel the player has.

In an embodiment, a player can be continuously wagering money from the money (or credit) meter, while requiring fuel to continue playing (which can be found in power ups). In a further embodiment, only a money (or credit) meter need be displayed, which serves as both fuel and as the award amount. In a further embodiment, the fuel meter (or other game parameter) can be continuously wagered by converting this into a monetary amount and determining a potential award from the monetary amount and then converting this amount back into fuel. The general principle is that a plurality of game parameters can be displayed alongside the game, and the game can use any for continuous wagering and any for representation of gameplay parameters, with conversion allowed between two or more therein.

Figure 11:
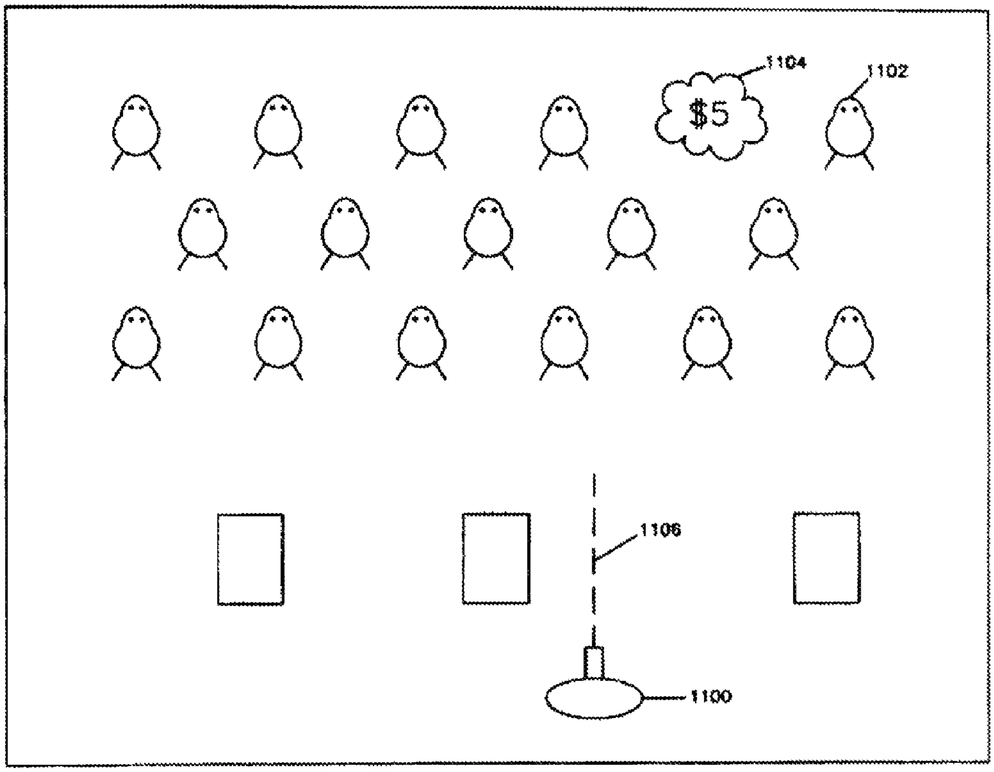
FIG. 11 is an exemplary output of a space shooter game, according to an embodiment.

FIG. 11 is an exemplary output of a space shooter game, according to an embodiment.

This genre of game can be used with any of the embodiments and variations described herein. For example, in the "unlimited access" category, a player could pay to receive an entire level. Then a player can play normally, killing aliens by firing his or her weapon and also possibly getting killed as well. The player can have an indestructible craft 1100, an unlimited number of lives, or some further feature allowing the player to uncover all of the awards in the game. Each alien the player kills by a projectile 1106 can reveal an award 1104 (or lack thereof).

This genre of game can also be used with the "pay as you go" embodiment. In this embodiment, each time the player shoots his or her weapon and hits a target 1100, a cost can be debited as well as a potential award can be generated. Alternatively, each time the player fires, a cost can be debited and if a target is not hit then the cost can be refunded. While not pictured, the display (of any of these types of games) can display both credits or awards and/or points earned in the game. The credits/awards may be redeemable for cash while the points may be relevant to the game itself but not redeemable for cash. For example, each alien shot may be worth 10 points, but whether or not the player has earned any credits redeemable for cash for the alien is a case-by-case basis. Thus, a standard game of this type can be supplemented with wagering; the score may be kept in the same manner as the standard game but monetary awards can be implemented as described herein.

This genre of game can also be used with the continuous embodiment as described in the pay as you embodiment but also the player is debited per unit of time or distance moved by the player's spaceship. Awards can be generated for each unit of time and can be awarded instantly or collected for a later disbursement (e.g. in the form of a power-up). For example a flying saucer can appear which can then be shot by the player (or self destructed) to reveal these accumulated awards. Alternatively, these accumulated awards can appear in any target shot or the last target shot.

Figure 12:
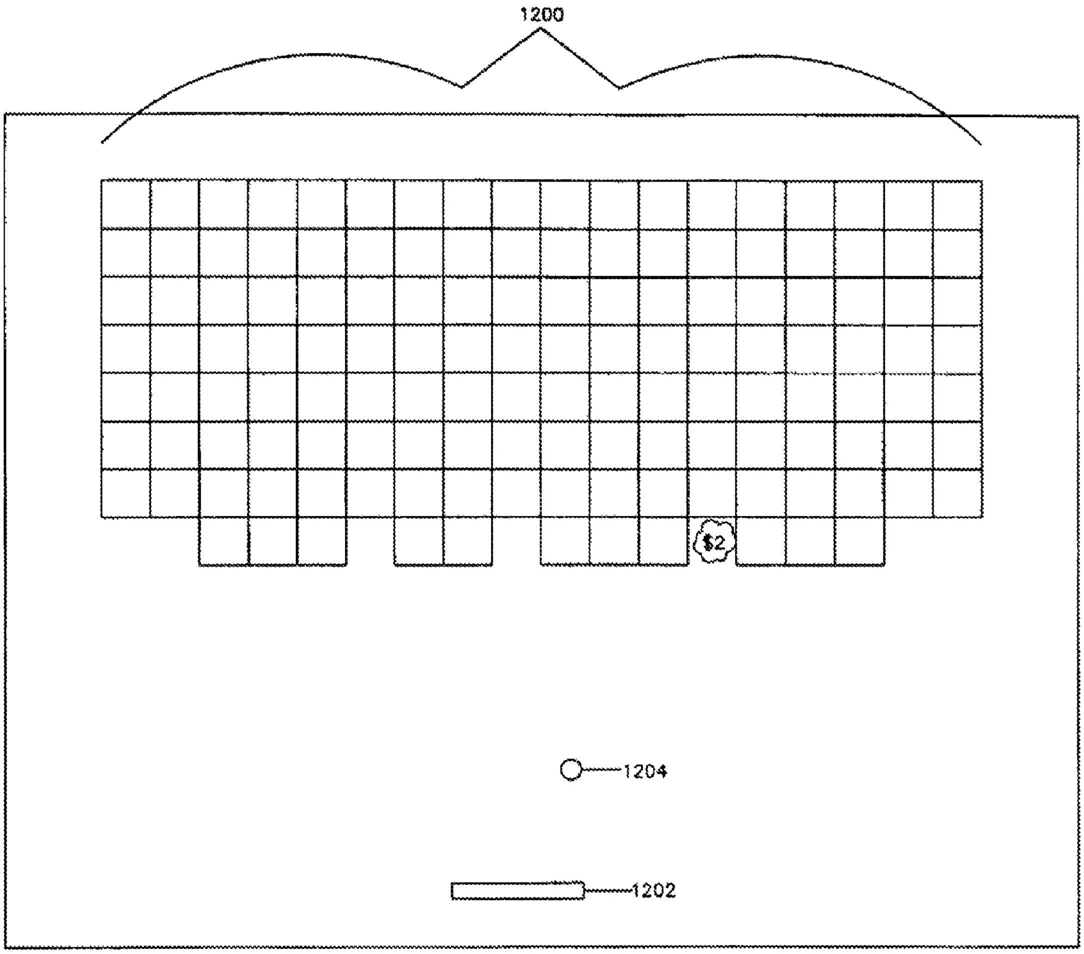
FIG. 12 is an exemplary output of a brick destroy game, according to an embodiment.

FIG. 12 is an exemplary output of a brick destroy game, according to an embodiment.

This genre of game can be used with any combination of the embodiments and variations described herein. For example, in the "unlimited access" category, a player could pay to receive an entire level. Then a player can play normally, wherein each brick destroyed from a brick wall 1200 can have a potential award generated (this includes awards of $0). The player can have an unlimited number of lives.

This genre of game can also be used with the "pay as you go" embodiment. In this embodiment, each time the player hits the ball 1204 with the paddle 1202 and then hits a brick, a cost can be debited as well as a potential award can be generated. If the player hits the ball 1204 with the paddle 1202 but misses a brick then no cost can be debited to the player. Alternatively, each time the player hits the ball 1204 with his or her paddle 1202 a cost can be debited and if a brick is not hit then the cost can be refunded.

This genre of game can also be used with the continuous embodiment as described in the "pay as you go" embodiment but also the player is debited per unit of time or distance moved by the paddle 1202. Awards can be generated for each unit of time and can be awarded instantly or collected for a later disbursement (e.g. in the form of a power-up). For example a special brick can appear which can then be destroyed by the player (or self destructed) to reveal these accumulated awards. Alternatively, these accumulated awards can appear in the last brick destroyed.

The present general inventive concept can be applied to a multiplayer game, as well as saving states of games currently in progress on a local or networked storage.

Figure 13:
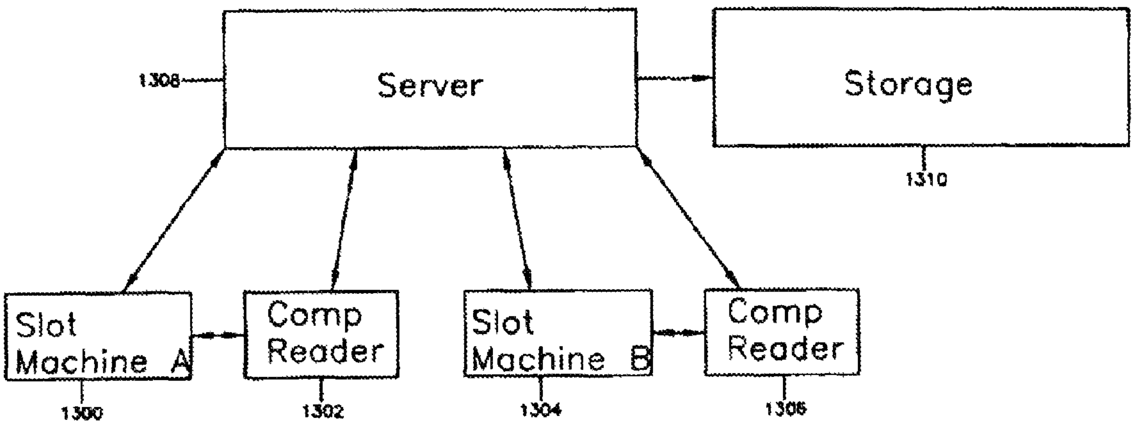
FIG. 13 is an exemplary block diagram illustrating a networked slot machine and server architecture, according to an embodiment.

FIG. 13 is an exemplary block diagram illustrating a networked gaming machine and server architecture, according to an embodiment.

Gaming machine A 1300 (can be a slot or other type of gaming machine) is connected to comp card reader 1302, both of which are connected to server 1308. Gaming machine B 1304 is connected to comp card reader 1306, both of which are connected to server 1308. Server 1308 is connected to storage 1310.

A player on Gaming machine A can save his or her game in progress if the player has inserted his or her comp card into the comp card reader 1302. The server 1308 can identify the player's identity from information on the comp card and allocate or identify a record in the storage 1310 for the player. This record can be used to save the current game in progress and upon resumption of the game by the player, this record can be retrieved.

When a game is resumed it may or may not be no the same level or setting. For example, a player may save a game on one level (e.g. a Daytona racetrack), and resume the game but be placed in a different racetrack.

Additionally, players on different gaming machines can interact with each other and thus different players can appear in the same world. The server 1308 can serve the playing world data to the players which includes location, actions, etc, of each player.

Figure 14:
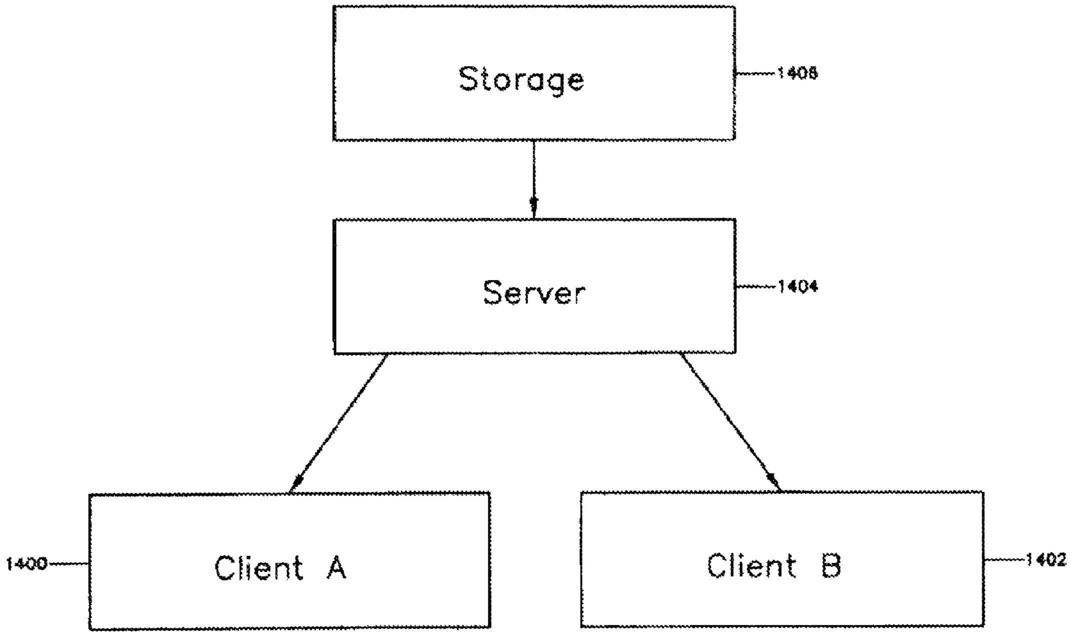
FIG. 14 is an exemplary block diagram illustrating a multiplayer architecture using a computer communications network, according to an embodiment.

FIG. 14 is an exemplary block diagram illustrating a multi-player architecture using a computer communications network, according to an embodiment.

A server 1404 is connected to a storage 1406. client A 1400 and client B 1402 can be connected to server 1404 via a computer communications network such as the Internet. In this manner, the present general inventive concept can be applied to multi-player games on the Internet. A multiplayer game can use any of the configurations and embodiments here.

Figure 15:
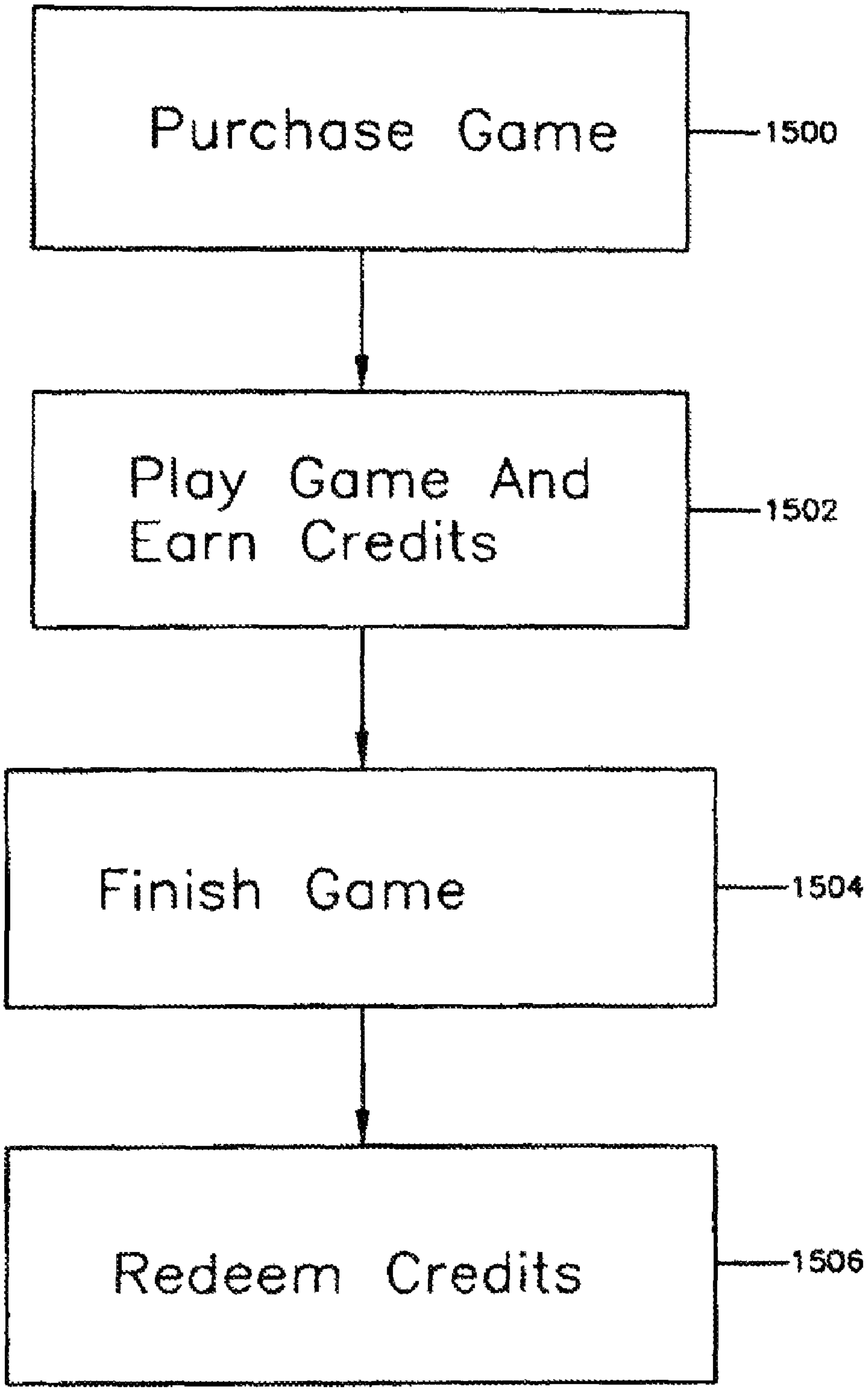
FIG. 15 is an exemplary flowchart illustrating a method of purchasing a game incorporating cash awards, according to an embodiment.

FIG. 15 is an exemplary flowchart illustrating a method of purchasing a game incorporating cash awards, according to an embodiment.

The method begins with operation 1500 wherein a player purchases a game. The purchase can be made in a store or online. A game can come embedded with monetary awards capabilities. Alternatively, depending on the embodiment, additional software may need to be downloaded (see the below description).

From operation 1500, the method proceeds to operation 1502, wherein the player plays the game and earns credits. The credits can be ultimately redeemable for cash.

From operation 1502, the method proceeds to operation 1504, wherein the player finishes playing the game.

From operation 1504, the method proceeds to operation 1506, wherein the player redeems credits. Credits can be redeemed for example by using a software application provided to the player which allows the player to designate a method of payment and communicates the request to the remote server for processing. For example, if a player is due $50, the player can request a check (or any other cashout method) for the $50 and the remote entity should send the player his or her check.

Figure 16:
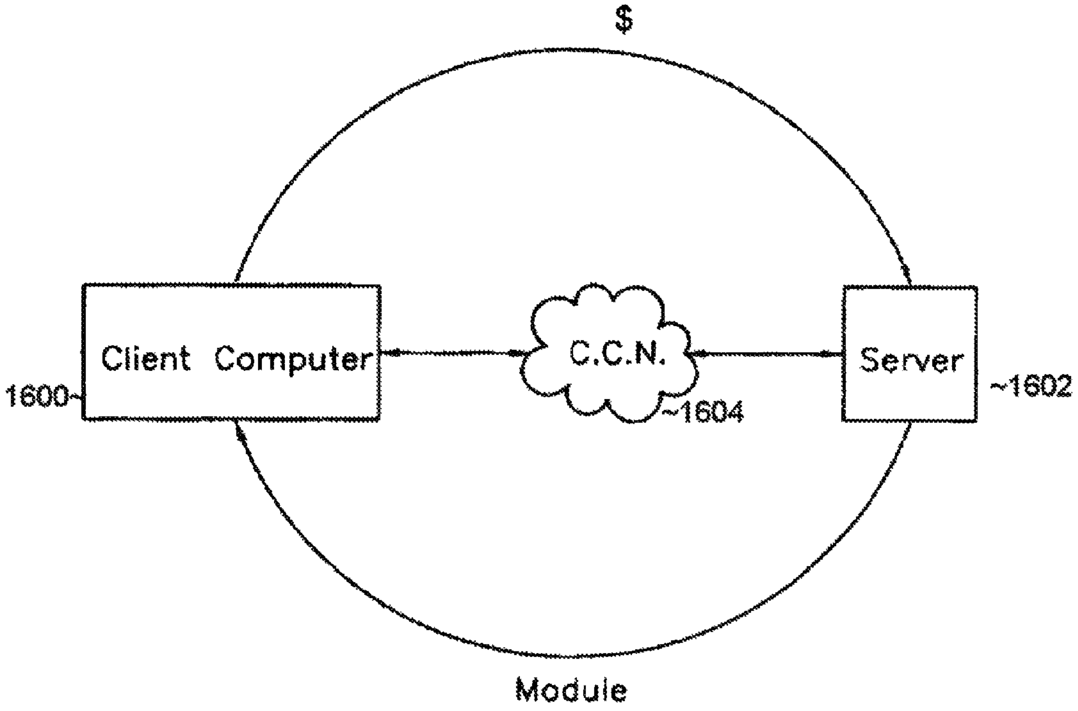
FIG. 16 is an exemplary block diagram illustrating a method of purchasing a game incorporating cash awards, according to an embodiment.

FIG. 16 is an exemplary block diagram illustrating a method of purchasing a game incorporating cash awards, according to an embodiment.

A client computer 1600 can be a home computer connected to a computer communications network 1604 (e.g. the Internet). A remote server 1602 can be in communication with the client computer 1600 via the computer communications network 1504.

The player (not pictured) on the client computer side can be in possession of a game purchased either retail or online. The player can request to the server 1602 a plug in or software module that can install on the client computer 1600 which contains the data to implement any of the embodiments described herein, e.g. awards, etc. After the player is done playing the game, the player can redeem any monetary awards he or she has earned using the server 1602 (or a different server).

Thus, for example, a player can purchase a retail version of a game, such as a 3D shooter game. The player can then download (or also purchase retail) a separate module that can install (typically after the main game is installed) which can "upgrade" the retail version to allow for wagering. As the player plays the standard game, the player will also receive credits which are associated with monetary awards.

When the player is done playing the game, typically when the player has completed the game, the final amount of credits the player has earned is displayed which can then be redeemable for cash. The player can then request disbursement of the funds and receive a check or other payments mechanism. Any of the embodiments herein can be used in this manner, although the "unlimited access" would be the easiest category to include with a standard retail game. For example, predetermined treasures or other awards can be located throughout the level which typically would not affect gameplay.

Thus, a player can purchase a regular retail game and also earn real money playing at the same time, providing a more exciting experience.

It is also noted that any type of gaming machine can implement the present invention, whether the gaming machine is video or mechanical, finite or random environment, class III or any other class, local software or downloadable client, or any other software/hardware implementations of gaming machines currently known in the art.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

It is further noted that the operations described herein can be performed in any sensible order. Further, any operations which are not required for the proper operation of a method may be optional.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer implemented method to allow wagering during a video game, the method comprising:

receiving a deposit from a player representing a cash amount and converting the cash amount into player credits;

allowing a player to play a computer implemented video game with an input device which allows the player to move a player icon around in a 2-D or 3-D playing world;

displaying to the player displayed icons comprising a first target icon and a second target icon, the first target icon and the second target icon being displayed simultaneously;

receiving a choice from the player to attack a chosen target out of the displayed icons with the player icon, wherein said first target icon is associated with a first distribution and said second target icon is associated with a second distribution, wherein the attack is shooting a projectile from the player icon toward the chosen target or using a weapon associated with the player icon on the chosen target; and determining a payback amount using an associated distribution associated with the chosen target, wherein an expected value of the first distribution is equal or approximately equal to an expected value of the second distribution, wherein a variance of the first distribution is different than a variance of the second distribution, variance referring to a mathematical measure of distribution of awards;

adding the payback amount to the player credits; and providing the player an option to redeem the player credits as money.

2. A method as recited in claim 1, further comprising:

if the chosen target is the first target icon, debiting a first amount from the player credits;

if the chosen target is the second target icon, debiting a second amount from the player credits.

3. The method as recited in claim 2, wherein the first amount and the second amount are different.

4. The method as recited in claim 1, wherein the player icon is displayed in a 3-D first person game.

5. The method as recited in claim 1, wherein the player icon is displayed in a 2-D game.

6. The method as recited in claim 1, further comprising, displaying the payback amount and removing the chosen target.

7. The method as recited in claim 1, wherein the first target icon is an alien and the player icon is a craft.

8. The method as recited in claim 1, wherein the first target icon is a brick and the player icon is a paddle.

9. An apparatus comprising:

a computer; and a computer-readable storage in communication with the computer and storing instructions configured to direct the computer to perform:

receiving a deposit from a player representing a cash amount and converting the cash amount into player credits;

allowing a player to play a computer implemented video game with an input device which allows the player to move a player icon around in a 2-D or 3-D playing world;

displaying to the player displayed icons comprising a first target icon and a second icon, the first target icon and the second target icon being displayed simultaneously;

receiving a choice from the player to attack a chosen target out of the displayed icons with the player icon, wherein said first target icon is associated with a first distribution and said second target icon is associated with a second distribution, wherein the attack is shooting a projectile from the player icon toward the chosen target or using a weapon associated with the player icon on the chosen target;

determining a payback amount using an associated distribution associated with the chosen target, wherein an expected value of the first distribution is equal or approximately equal to an expected value of the second distribution, wherein a variance of the first distribution is different than a variance of the second distribution, variance referring to a mathematical measure of distribution of awards;

adding the payback amount to the player credits; and providing the player an option to redeem the player credits as money.

10. An apparatus as recited in claim 9, wherein:

if the chosen target is the first target icon, debiting a first amount from the player credits;

if the chosen target is the second target icon, debiting a second amount from the player credits.

11. The method as recited in claim 10, wherein the first amount and the second amount are different.

12. The method as recited in claim 9, wherein the player icon is displayed in a 3-D first person game.

13. The method as recited in claim 9, wherein the player icon is displayed in a 2-D game.

14. The method as recited in claim 9, further comprising, displaying the payback amount and removing the chosen target.

15. The method as recited in claim 9 wherein the first target icon is an alien and the player icon is a craft.

16. The method as recited in claim 9, wherein the first target icon is a brick and the player icon is a paddle.

17. A computer implemented method to allow wagering during a video game, the method comprising:

placing, by a player using a computer, a deposit representing a cash amount and receiving corresponding player credits;

playing, by the player using the computer, a computer implemented video game which allows the player to move a player icon around in a 2-D or 3-D playing world;

viewing, by the player using the computer, displayed icons comprising a first target icon and a second target icon, the first target icon and the second target icon being displayed simultaneously;

making a choice, by the player using the computer, to attack a chosen target out of the displayed icons with the player icon, wherein said first target icon is associated with a first distribution and said second target icon is associated with a second distribution, wherein the attack is shooting a projectile from the player icon toward the chosen target or using a weapon associated with the player icon on the chosen target;

receiving, by the player using the computer, a payback amount added to the player credits, the payback amount based on an associated distribution associated with the chosen target, wherein an expected value of the first distribution is equal or approximately equal to an expected value of the second distribution, wherein a variance of the first distribution is different than a variance of the second distribution, variance referring to a mathematical measure of distribution of awards; and receiving, by the player using the computer, an option to redeem the player credits as money.

18. The method as recited in claim 17, if the chosen target is the first target icon, then a first amount is debited from the player credits;

if the chosen target is the second target icon, then a second amount is debited from the player credits.

19. The method as recited in claim 18, wherein the first amount and the second amount are different.

20. The method as recited in claim 17, wherein the payback amount is determined on a remote computer remote from the computer.

* * * * *